United States Patent [19]

Raad et al.

[11] Patent Number: 4,797,590
[45] Date of Patent: Jan. 10, 1989

[54] BRUSHLESS GENERATOR WITH MINIMAL AXIAL LENGTH

[75] Inventors: Bernard A. Raad; Edmund A. Schott, both of Rockford, Ill.

[73] Assignee: Sundstrand Corporation, Rockford, Ill.

[21] Appl. No.: 117,951

[22] Filed: Nov. 9, 1987

[51] Int. Cl.[4] .......................................... H02K 19/26
[52] U.S. Cl. ................................... 310/68 D; 310/112
[58] Field of Search .................... 310/54, 67 R, 68 R, 310/68 D, 112, 113, 114, 180, 181, 261, 266

[56] References Cited

U.S. PATENT DOCUMENTS

| | | | |
|---|---|---|---|
| 2,897,383 | 7/1959 | Barrows et al. | 310/68 D |
| 3,501,659 | 3/1970 | Pannell | 310/68 R |
| 3,733,503 | 5/1973 | Potter . | |
| 4,322,030 | 3/1982 | Jacobson et al. . | |
| 4,329,603 | 5/1982 | Ballard . | |
| 4,421,998 | 12/1983 | Ahner et al. | 310/68 D |
| 4,431,931 | 2/1984 | Perrier et al. . | |
| 4,482,827 | 11/1984 | Baldwin . | |
| 4,570,094 | 2/1986 | Trommer | 310/68 D |
| 4,603,344 | 7/1986 | Trommer . | |
| 4,621,210 | 11/1986 | Krinickas, Jr. . | |
| 4,628,219 | 12/1986 | Troscinski | 310/68 D |
| 4,647,806 | 3/1987 | Guiffrida | 310/68 D |
| 4,683,389 | 7/1987 | Readman et al. | 310/62 |

FOREIGN PATENT DOCUMENTS 2221893 11/1973 Fed. Rep. of Germany ... 310/68 D

Primary Examiner—Patrick R. Salce
Assistant Examiner—D. L. Rebsch
Attorney, Agent, or Firm—Wood, Dalton, Phillips, Mason & Rowe

[57] ABSTRACT

An undesirably long brushless generator including a permanent magnet generator 114, 116, 118, an exciter 64 and a main generator 22, 24, 42, 44 may have its axial length reduced by locating both the permanent magnet generator 114, 116, 118 and the exciter 64 adjacent one end of the main generator 22, 24, 42, 44 in an essentially coplanar relation with the permanent magnet generator 114, 116, 118 radially inward of the exciter 64.

14 Claims, 1 Drawing Sheet

BRUSHLESS GENERATOR WITH MINIMAL AXIAL LENGTH

FIELD OF THE INVENTION

This invention relates to brushless generators having interconnected permanent magnet generators, exciters and main generators. More particularly, it relates to brushless generators of the foregoing type wherein axial length is minimized.

BACKGROUND OF THE INVENTION

Brushless generators are conventionally formed of a permanent magnet generator, an exciter, and a main generator. Typically, relatively low levels of power are generated by the permanent magnet generator which is made up of a permanent magnet field carried by the generator rotor and which induces electrical energy in a permanent magnet generator output winding. The power from this winding is rectified and subjected to known control parameters before being fed to a stationary field winding of the exciter. The exciter also includes an output winding carried by the rotor and as the same rotates within the magnetic field generated by the exciter field winding, electrial energy is induced in the exciter output winding. The current will be alernating current and typically will be three phase alternating current.

In any event, the resulting electrical energy is rectified by means of a rectifier carried by the rotor and rotating therewith and then supplied to the main field winding of the main generator. The main field winding is, of course, carried by the rotor and when energized with direct current, and when rotated provides a rotating magnetic field which in turn induces an alternating current in a stationary, main armature output winding. Power thus generated may be taken from the stationary main armature output winding to a point of use and it will be appreciated that the entire system is operative without any need for the presence of brushes.

These systems work very well for their intended purpose which most frequently but not always, is in aircraft power generating applications. The generators are coupled mechanically to the aircraft engine. In the case of jet engines, the coupling is to the engine gear box with the generating system being housed in the same cowling as the engine itself.

It is of course desirable in aircraft applications to minimize weight. In the case of brushless generators having a relatively long axial length, because such generators are typically mounted to the engine gear box at only one end of the generator, such generators result in the presence of a relatively large, so-called "overhung" moment. In order to support such a generator, the gear box must be made proportionately stronger than would be the case for a generator having a lesser overhung moment; and that reinforcement will most frequently require the presence of additional, undesirable weight. In addition, aircraft applications require that close heed be paid to aerodynamic consideration. These considerations may dictate location of aircraft components in areas where space is at a premium or else an aerodynamic penalty may be felt.

The present invention is directed to overcoming one or more of the above problems.

SUMMARY OF THE INVENTION

It is the principal object of the invention to provide a new and improved brushless generator. More specifically, it is an object of the invention to provide such a generator which has a relatively short axial length.

An exemplary embodiment of the invention achieves the foregoing object in a brushless generator including a permanent magnet generator, an exciter, and a main generator together with means coupling the components to define a brushless generator.

According to the invention, the permanent magnet generator and the exciter are closely adjacent to one end of the main generator, with one of the permanent magnet generator and the exciter disposed radially outward of the other.

In a preferred embodiment the radially inward component is the permanent magnet generator and both the exciter and the permanet magnet generator are generally coplanar in a plane that is transverse to the rotational axis of the generator as a whole.

More particularly, the invention provides a brushless generator having a stationary armature with a rotor-receiving opening, an exciter field and a permanent magnet generator output. A rotor is journalled for rotation about an axis within an opening of the stator and includes a main field winding, an exciter output winding, a rotating rectifier interconnecting the main field winding and the exciter output winding along with a permanent magnet generator field. The exciter field winding is operatively associated with the exciter output winding and the permanent magnet generator winding is operatively associated with the permanent magnet generator field. As noted, these components are generally coplanar in a plane transverse to the axis and are axially spaced from, but adjacent to the main field winding.

According to a preferred embodiment of the invention, the rectifier is generally coplanar with the main field winding and is located radially inwardly thereof.

In a preferred embodiment, the rotor of the generator is comprised of a main shaft and a secondary shaft with the secondary shaft being hollow and mounted on the main shaft to be radially spaced outwardly therefrom. One of the exciter output winding and the permanent magnet generator field is carried on the interior surface of the secondary shaft and the other of the exciter output winding and the permanent magnet generator field is carried on the exterior of the secondary shaft.

In a highly preferred embodiment, there is an annular space between the main shaft and the one of the exciter output winding and the permanent magnet generator field and a portion of the stator extends into that annular space.

One embodiment of the invention includes a bearing for the rotor which is located adjacent the annular space. The stator portion is removably attached to the generator and engages and positions the bearing to serve as a removable bearing retainer.

In this embodiment of the invention, the bearing includes an outer race and the stator portion is in radial, supporting engagement with the outer race and thereby provides that function as well as bearing retention.

According to the invention, the secondary shaft is formed of magnetic material and forms part of a magnetic circuit for the permanent magnet generator field.

According to another facet of the invention, there is further providing means for establishing a high pressure coolant flow path to the rotor and through the rectifier. The flow path is subjected to leakage at low pressure areas within the rotor. The connections between the rectifier and at least one of the exciter output and main field windings is located in the low pressure area for enhanced reliability.

Other objects and advantages will become apparent from the following specification taken in connection with the accompanying drawing.

DESCRIPTION OF THE PREFERRED EMBODIMENT

Figure 1:
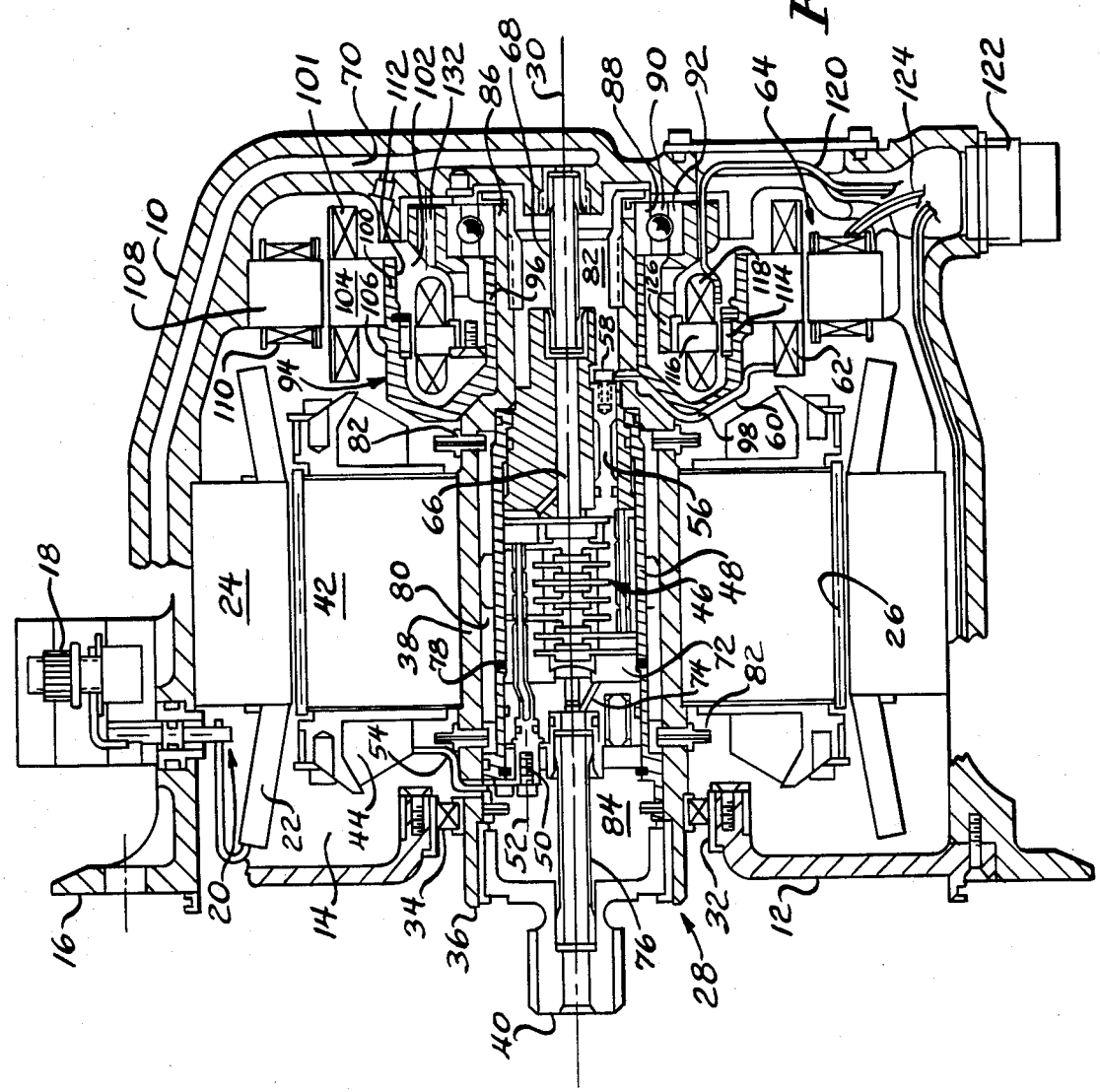
FIG. 1 is a sectional view of an exemplary embodiment of a brushless generator made according to the invention.

An exemplary embodiment of a brushless generator made according to the invention is illustrated in FIG. 1 and is seen to include a generally bell-shaped housing 10 which may be provided with an end cap 12 for closing an open end 14. The open end 14 is surrounded by a flange 16 whereby the generator may be mounted to a suitable drive as, for example, a conventional constant speed drive.

The housing 10, on one side thereof, mounts a plurality of terminals 18 (only one of which is shown). A connecting system, generally designated 20, extends from the terminals 18 into the interior of the housing 10 to the output winding 22 of the main generator armature 24 which is suitably stationarily mounted within the housing 10. The armature 24 then constitutes part of the stator of the generator.

The armature 24 includes a central opening 26 within which a rotor, generally designated 28, is journalled for rotation about an axis 30. In particular, the end cap 12 includes an opening 32 which in turn mounts a bearing 34 for journalling one end 36 of a tubular main shaft 38.

A drive gear 40 is splined within the interior of the end 36 and is intended to be coupled to a source of rotational power (not shown).

The main shaft 38 mounts a ferromagnetic body 42 associated with a main field winding, the end turns 44 of which are shown. As is well known, direct current flows through the main field winding during operation of the generator and the resulting rotating magnetic field induces electricity in the main generator output winding 22 from which it may be conveyed to a point of use by connection to the terminals 18.

As mentioned previously, the main shaft 38 is hollow and within its interior is a rotating rectifier assembly, generally designated 46. The rectifier assembly 46 may be a full wave, three phase rectifier and is built generally according to the teachings of commonly owned U.S. Pat. No. 4,628,219 issued Dec. 9, 1986 to Troscinski, the details of which are herein incorporated by reference. As will be apparent from the Troscinski patent, the rectifier assembly 48 is essentially sealed in a housing 48. Two electrical leads 50 (only one which is shown) extend out of one end of the housing 48 to terminals 52. Conductors 54 interconnect the terminals 52 and the main field winding.

At the opposite end of the housing 48, there are three exteriorly extending conductors 56, terminating in terminals 58 which are coupled to conductors 60 to the output winding 62 of an exciter, generally designated 64.

Returning to the rotating rectifier assembly, one end includes a coolant passage 66 in fluid communication via a transfer tube 68 with a pressurized coolant passage 70 in the housing 10. A coolant, typically oil, at high pressure flows into the passage 70 from a pump (not shown) and transferred to the rotor 28 by means of the transfer tube 68, which may be of conventional construction. From the transfer tube 68, the oil while still under high pressure passes via the passage 66 to an interior chamber 72 of the rectifier assembly 46 wherein electrical components are housed to cool same. The oil exits the chamber 72 via passages 74 which in turn are in fluid communication with a second transfer tube 76 by which the oil may be directed to another system component as, for example, a constant speed drive, or to sump as desired.

The rectifier housing 48 also includes a series of openings 78 which open to an elongated, annular space 80 between the interior of the main shaft 38 and the housing 48. In fluid communication with the space 80 is a plurality of radially directed nozzles 82 which are aimed at the end turns 44 of the main field winding to spray coolant thereon to cool the same and to cool the main armature end turns 22 after passing through the main field and end turns 44.

In this connection, it will be noted that the conductor 50 and 56 as well as associated terminals 52 and 58 are isolated from the high pressure fluid flow path through the rectifier 46. There will, of course, be a certain amount of leakage from that flow path to areas 82 and 84 on opposite ends of the main shaft 38. These areas, however, will be at relatively low pressure and it is within these areas that the terminals 52 and 58 are located. This in turn reduces undesirable leakage from the cooling oil path in the direction of the main field windings 44 or the exciter output winding 62 which would otherwise occur if the connections were made in a high pressure area. And this in turn reduces the magnitude of so-called "windage" losses.

The end of the main shaft 38 opposite from the gear 40 is given the reference numeral 86 and is engaged by the inner race 88 of a ball bearing, generally designated 90. The ball bearing 90 also includes an outer race 92.

As can be seen in FIG. 1, the end 86 of the main shaft 38 is of reduced diameter and mounts a secondary shaft 94. The secondary shaft 94 includes a radially inner section 96 which is interference fitted on the reduced diameter end 86 of the main shaft, a generally radially extending web 98 and a radially outer section 100. The section 100 is spaced radially outward from the reduced diameter end 86 by the web 96 and as a consequence, an annular space 102 opening away from the main generator is formed.

A ferromagnetic body 104 is on the exterior surface 106 of the outer section 100 and includes the exciter output winding 62. Stationarily mounted on the housing 10 in axial alignment with the ferromagnetic body 104 and just radially outward thereof is the exciter field 108 which includes an exciter field winding 110 and which constitutes part of the stator of the machine.

On the inner surface 112 of the outer section 100 and within the annular space 102, there is mounted a series of permanent magnets 114 which constitute the field for the permanent magnet generator. In this regard, the outer section 100, and preferably the entire secondary shaft 94, is formed of a ferromagnetic material which then forms part of the magnetic circuit for the poles defined by the permanent magnets 114 as will be appreciated by those skilled in the art.

Just radially within the array of permanent magnets 114 and disposed within the annular space 102 is a ferromagnetic body 116 and associated output winding 118. Electrical leads 120 extend from the winding 118 to a connector 122 mounted on the housing 10 as do leads 124 from the exciter field winding 110. By means of an appropriate connection to the connector 122, a conventional regulating device may be employed to energize the exciter field winding 110 according to desired control parameters utilizing electrical energy induced in the permanent magnet generator output winding 118.

Figure 2:
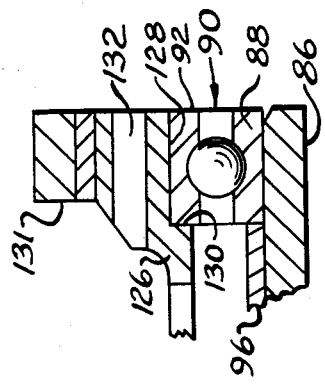
FIG. 2 is an enlarged, fragmentary view of a bearing retainer structure.

An annular mounting element 126 extends into the annular spaced 102 to mount the ferromagnetic body 116. As can be seen in FIGS. 1 and 2, the end of the annular mounting element 126 remote from the gear 40 includes an internal, peripheral groove 128. The groove 128 defines a step 130 and the latter abuts the outer race 92 of the journal bearing 90 while the inner diameter of the groove 128 provides radial support of the outer race 92 of the journal bearing 90 by engaging to about its radially outer periphery. The annular mounting element 126 is removably mounted to inwardly directed lugs or rings 131 on the interior of the housing 10 as by threaded fasteners (not shown) passing through openings 132.

Consequently, the annular support element 126, in addition to mounting the ferromagnetic body 116 and associated permanent magnet generator output winding 118 as part of the machine's stator, serves as a removable bearing retainer for the journal bearing 90 and provides radial support for the same as well.

From the foregoing, it will be appreciated that both the permanent magnet generator and the exciter of the invention are generally coplanar and are closely adjacent one side of the main generator while one of the exciter and the permanent magnet generator is located radially outward of the other. In the described embodiment, the permanent magnet generator is radially inward of the exciter since for normal power generating requirements of brushless generators, a permanent magnet generator is normally smaller than the exciter. However, their positions could be reversed if that is desired.

It will therefore be appreciated that because the permanent magnet generator and the exciter are essentially coplanar in a plane that is transverse to the axis of rotation of the machine while being closely adjacent one side of the main generator, the axial length of the machine is shortened at least by a distance corresponding to the axial length of the shortest one of the permanent magnet generator and the exciter. This in turn allows the overhung moment to be reduced, which is desirable as noted previously.

We claim:

1. A brushless generator capable of manufacture with a relatively short axial length, comprising:
    a stator having a rotor-receiving opening, an exciter field including a first ferromagnetic body and a permanent magnet generator output aramature including a second ferromagnetic body separate from said first ferromagnetic body; and a rotor journaled for rotation about an axis within said opening and including
    (a) a main field winding,
    (b) an exciter output winding,
    (c) a rotating rectifier interconnecting said main field winding and said exciter output winding, and
    (d) a permanent magnet generator field magnetically separate from said exciter output winding,
    said exciter field being operatively associated with said exciter output winding and said permanent magnet generator output armature being operatively associated with said permanent magnet generator field and generally coplanar in a plane transverse to said axis and axially spaced from, but adjacent to, said main field.

2. The generator of claim 1 wherein said permanent magnet generator field and armature are radially inward of said exciter field and output winding.

3. The generator of claim 1 wherein said rectifier is generally coplanar with said main field and located radially inward thereof.

4. A brushless generator capable of manufacture with a relatively short axial length, comprising:
    a stator having a rotor-receiving opening, an exciter field and a permanent magnet generator output armature; and
    a rotor journaled for rotation about an axis within said opening and including
    (a) a main field winding,
    (b) an exciter output winding,
    (c) a rotating rectifier interconnecting said main field winding and said exciter output winding, and
    (d) a permanent magnet generator field,
    said exciter field being operatively associated with said exciter output winding and said permanent magnet generator output armature being operatively associated with said permanent generator field and generally coplanar in a plane transverse to said axis and axially spaced from, but adjacent to, said main field;
    said rotor comprising a main shaft and a secondary shaft, said secondary shaft being hollow and mounted on said main shaft and radially spaced outwardly therefrom, one of said exciter output winding and said permanent magnet generator field being carried on the interior surface of said secondary shaft and the other of said exciter output winding and said permanent magnet generator field being carried on the exterior of said secondary shaft.

5. The generator of claim 4 wherein there is an annular space between said main shaft and said one of said exciter output winding and said permanent magnet generator field, and a portion of said stator extends into said annular space.

6. The generator of claim 5 further including a journal bearing for said rotor located adjacent said annular space and wherein said stator portion is removably attached to said generator and engages and positions said ball bearing to serve a removable bearing retainer.

7. The generator of claim 5 wherein said ball bearing includes an outer race and said stator portion is in radial supporting engagement with said outer race.

8. The generator of claim 4 wherein said secondary shaft is formed of magnetic material and forms part of a magnetic circuit for said permanent magnet generator field.

9. The generator of claim 8 wherein said permanent magnet field is located on the interior surface of said secondary shaft and said permanent magnet armature is aligned therewith.

10. The generator of claim 9 wherein said permanent magnet generator output armature is radially inward of said permanent magnet field and radially outward of said main shaft.

11. The generator of claim 1 further including means establishing a high pressure coolant flow path to said rotor and through said rectifier, said flow path being subject to leakage to at least one low pressure area within said rotor, and connections between said rectifier and at least one of said exciter output and main field windings being located in said low pressure area.

12. A brushless generator capable of manufacture with a relatively short axial length comprising:
    a stator having a rotor receiving opening, an exciter field winding, and a permanent magnet generator output winding; and
    a rotor journalled for rotation about an axis within said opening, said rotor including a hollow main shaft and a hollow secondary shaft, said secondary shaft being fitted about the main shaft radially outward thereof to define an annulus between said main shaft and said secondary shaft, said secondary shaft having a lesser axial length than said main shaft;
    said rotor further including a main field winding axially adjacent to said secondary shaft, an exciter output winding carried by said secondary shaft, a permanent magnet field carried by said secondary shaft and a rotating rectifier assembly disposed within the interior of said main shaft and interconnecting said main field winding and said exciter output winding;
    one of said exciter field winding and said permanent magnet generator output winding being disposed within said annular space in axial alignment with the corresponding one of said exciter output winding and said permanent magnet field, the other of said exciter field winding and said permanent magnet generator output winding being located radially outward of the corresponding one of said exciter output winding and said permanent magnet field in axial alignment therewith.

13. A brushless generator capable of manufacture with a relatively short axial length and comprising:
    a permanent magnet generator, an exciter, and a main generator; and
    means operatively interconnecting said permanent magnet generator, said exciter and said main generator to provide a brushless generator;
    both said permanent magnet generator and said exciter being closely axially adjacent one side of the main generator while being magnetically separate from one another;
    one of said exciter and said permanent magnet generator being located radially outward of the other of said permanent generator and said exciter and in surrounding relation thereto.

14. The generator of claim 13 wherein said permanent magnet generator is radially inward of said exciter.

* * * * *